July 26, 1938.                    H. W. FIES                    2,124,734
                                   CLUTCH
                            Filed Jan. 25, 1937
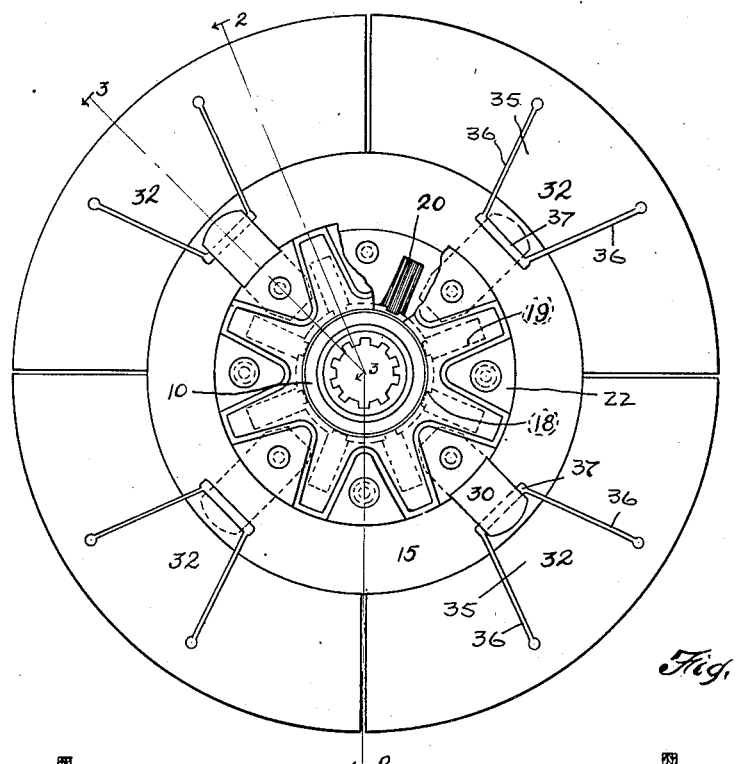
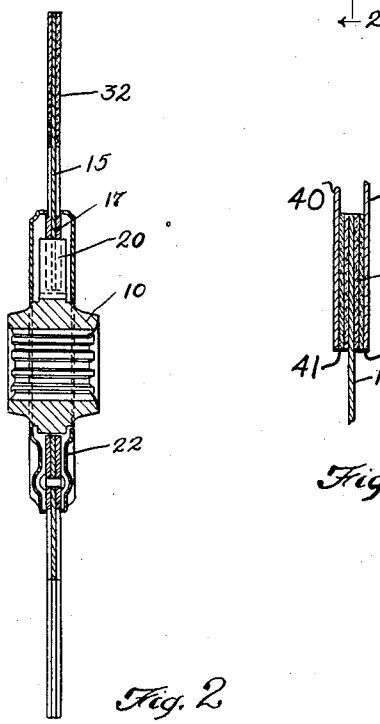
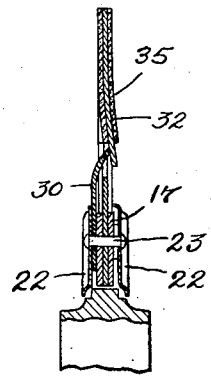
INVENTOR.
Herbert W. Fies
BY
Bayh, Oberlin & Bayh
ATTORNEYS Patented July 26, 1938

2,124,734

UNITED STATES PATENT OFFICE 2,124,734

CLUTCH

Herbert W. Fies, Cleveland Heights, Ohio, assignor to The Cleveland Graphite Bronze Company, Cleveland, Ohio, a corporation of Ohio Application January 25, 1937, Serial No. 122,158

4 Claims. (Cl. 192—107)

The present invention, relating as indicated to a clutch, is more particularly directed to a clutch plate of all metallic construction designed for use in automotive vehicles and the like. The principal purpose of the invention is the provision of an inexpensive light-weight clutch plate capable of being yieldingly engaged with the cooperating parts of the clutch assembly. A further object of the invention is the provision of a clutch plate of the type referred to which will be sufficiently light in weight and will have sufficient yield during engagement to permit it to be engaged with a minimum of shock to the clutch assembly and to the mechanism connected thereto.

To the accomplishment of the foregoing and related ends, said invention, then, consists of the means hereinafter fully described and particularly pointed out in the claims; the annexed drawing and the following description setting forth in detail certain structure embodying the invention, such disclosed structure constituting, however, but one of the various structural forms in which the principle of the invention may be used.

In said annexed drawing:—

Fig. 1 is a front elevation of my improved clutch plate;

Fig. 2 is a section on the line 2—2, Fig. 1;

Fig. 3 is a section on the line 3—3, Fig. 1; and

Fig. 4 is a partial transverse section illustrating the engagement between the clutch plate referred to and the cooperating parts.

Referring now to Figs. 1 and 2, the clutch plate will be seen to consist of a splined hub member 10, provided with radial slots of slight depth in its outer periphery into which fit a series of resilient leaves 20, shown in Fig. 1, which in turn are engaged with the corresponding slots in the clutch plate 15. The resilient leaves 20 provide a cushioning of the driving shock between the hub and the clutch plate proper and the leaves are held in position in the two sets of cooperating slots, and the clutch plate and hub are maintained in the relationship shown in Figs. 1 and 3, by means of two cover plates 22 which are riveted together, by means of the rivets 23, maintaining the leaves in position, the rivets 23 passing through the clutch plate, as indicated in Fig. 3.

The clutch plate 15 is of hard resilient material, such as spring steel, and is of extreme thinness and lightness. The thinness permits the plate to be deformed out of its normal plane in the manner and for the purposes which will be hereinafter indicated, while the thinness and light weight of the plate reduces greatly the momentum when disengaged. The plate is provided on either surface with spaced sectors of metallic friction material 32 which are integrally secured to the plate proper and extend inwardly about one-third of the distance from the periphery of the plate to its center. The metallic friction sectors may be of various materials such as a sintered mixture of powdered non-ferrous metal and graphite, and the size of these sectors for any given torque will of course be varied, depending upon the coefficient of friction of the particular material employed. The sectors themselves are quite thin and are sufficiently flexible to be deformed to the extent hereinafter described as a part of the plate 15 proper.

The outer composite portion of the clutch plate, that is, the plate proper and the attached facing sectors, are slotted as indicated in Fig. 1 to provide roughly V-shaped tongues 35, the slots 36 extending into a circumferentially extending slot 37 to free the inner radial end of the tongue. Four of these tongues are provided and are deformed out of the normal plane of the plate 15 by means of curved springs 30, which are clamped between the retaining covers 22 and the spacing rings or plates 17. These spring members are rectangular in outline and have a curved outer end, the normal position of which is indicated in Fig. 3 and which presses the inner end of the tongue laterally out of the plane of the plate 15.

Upon engagement of the clutch plate 15 with its sectors or facings 32 with other members in a clutch assembly, such as the pressure plates 40 having similar facings 41, the four tongues 35 engage first, absorbing the torsional shock and, upon the continuation and progress of the engagement, are forced back into the normal plane of the member 15, in this way providing a cushioning engagement for the clutch plate and greatly facilitating the smoothness of the engagement.

The advantages of the present clutch plate are the possession of metallic facings over the engaging portions of the plate, the smoothness with which the outer faces of such facing members may be formed, providing a complete overall engagement and thereby compensating for any lack of frictional capacity, the light weight of the composite plate, and the deformed resiliently supported engaging portions which facilitate the smooth engagement of the clutch elements. Light weight is a very decided advantage in clutch plates. If a heavy plate is employed it has a very considerable tendency to continue rotation when disengaged. If re-engaged before this rotation is stopped, as is ordinarily the case when shifting from one gear to another in an automotive vehicle, there is a very decided wear upon re-engagement because a moving part is then re-engaged with a relatively stationary part, with resultant excessive wear on the clutch plate and early failure. My improved plate overcomes the disadvantages of the plates which have heretofore been used and provides a relatively inexpensive light and yieldingly engageable clutch element.

Other forms may be employed embodying the features of my invention instead of the one here explained, change being made in the form or construction, provided the elements stated by any of the following claims or the equivalent of such stated elements be employed.

I therefore particularly point out and distinctly claim as my invention:—

1. A clutch plate of the character described, comprising a central hub, a thin resilient metallic plate secured thereto and provided with resilient portions extending out of the plane thereof, and thin metallic frictional elements secured to the opposite sides of the outermost portion of said plate including the portions extending out of the normal plane thereof, and additional spring means carried by said plate adapted to bear against said last named portions to urge them outwardly.

2. A clutch plate of the character described, comprising a hub, a thin resilient metallic plate secured thereto, said plate having a series of connected radial slots forming a plurality of radially extending tongues capable of being depressed out of the normal plane of said plate, resilient means normally depressing said tongues out of the plane of said plate, and sectors of metallic frictional material secured to opposite faces of the outermost portion of said plate, including said tongues.

3. A clutch plate of the character described, comprising a hub, a thin metallic circular plate concentrically mounted about and secured to said hub, said plate having a series of connected slots forming a plurality of inwardly extending radially arranged tongues in said plate, sectors of metallic frictional material integrally united to the outer faces of the outermost portions of said plate including said tongues, and resilient members secured to said plate and normally depressing the radially innermost ends of said tongues out of the normal plane of said plate.

4. A clutch plate of the character described, comprising a central hub, a thin resilient metallic plate with thin metallic frictional elements secured to the opposite sides of said plate and with portions of said composite plate being resilient in a direction transverse to the plane of the plate, and additional spring means carried by said plate adapted to bear against said last named portions to urge them outwardly.

HERBERT W. FIES.